US006597957B1

(12) United States Patent
Beakley (10) Patent No.: US 6,597,957 B1
(45) Date of Patent: Jul. 22, 2003

(54) SYSTEM AND METHOD FOR CONSOLIDATING AND SORTING EVENT DATA

(75) Inventor: Jonathan G. Beakley, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/465,878

(22) Filed: Dec. 20, 1999

(51) Int. Cl.[7] .............................................. G05B 19/18
(52) U.S. Cl. ............................. 700/7; 700/11; 700/12; 700/23; 700/48; 700/52; 700/53; 706/2; 706/8; 706/10; 706/18; 706/45
(58) Field of Search ............................... 700/2, 5–7, 11, 700/12, 23, 48, 49, 51–53, 73, 74; 706/2, 8, 10, 18–19, 20–21, 45, 60–61

(56) References Cited

U.S. PATENT DOCUMENTS

| 5,032,979 | A | | 7/1991 | Hecht et al. ................ 364/200 |
|---|---|---|---|---|
| 5,101,402 | A | | 3/1992 | Chiu et al. ..................... 370/17 |
| 5,278,901 | A | | 1/1994 | Shieh et al. ..................... 380/4 |
| 5,414,833 | A | | 5/1995 | Hershey et al. ............. 395/575 |
| 5,448,724 | A | | 9/1995 | Hayashi ................. 395/182.02 |
| 5,467,268 | A | * | 11/1995 | Sisley et al. ..................... 705/9 |
| 5,488,715 | A | | 1/1996 | Wainwright ........... 395/182.02 |
| 5,524,238 | A | | 6/1996 | Miller et al. ................. 395/600 |
| 5,557,742 | A | | 9/1996 | Smaha et al. ............... 395/186 |
| 5,606,668 | A | | 2/1997 | Shwed ................... 395/200.11 |
| 5,621,889 | A | | 4/1997 | Lermuzeaux et al. ....... 395/186 |
| 5,640,319 | A | * | 6/1997 | Beuning et al. ................ 700/2 |
| 5,699,513 | A | | 12/1997 | Feigen et al. .......... 395/187.01 |
| 5,737,728 | A | * | 4/1998 | Sisley et al. ..................... 705/8 |
| 5,793,763 | A | | 8/1998 | Mayes et al. ................ 370/389 |
| 5,796,942 | A | | 8/1998 | Esbensen ............... 395/187.01 |
| 5,798,706 | A | | 8/1998 | Kraemer et al. ....... 340/825.07 |
| 5,805,801 | A | | 9/1998 | Holloway et al. ..... 395/187.01 |
| 5,826,014 | A | | 10/1998 | Coley et al. ........... 395/187.01 |
| 5,889,993 | A | * | 3/1999 | Kroeger et al. ............. 717/128 |
| 5,919,257 | A | | 7/1999 | Trostle ....................... 713/200 |
| 5,931,946 | A | | 8/1999 | Terada et al. ................ 713/201 |
| 5,943,652 | A | * | 8/1999 | Sisley et al. ..................... 705/9 |
| 5,991,881 | A | | 11/1999 | Conklin et al. ............. 713/201 |

OTHER PUBLICATIONS

"Preliminary Report on Advanced Security Audit Trail Analysis on UNIX," N. Habra et al., pp. 1–34 (found at http://www.cs.purdue.edu/coast/archive/data/categ24.html), Sep. 1994.

"IDIOT–Users Guide," M. Crosbie, et al., pp. 1–63, (found at http://www.cs.purdue.edu/coast/archive/data/categ24.html), Sep. 1996.

"An Introduction to Intrusion Detection," A. Sundaram, pp. 1–10, (found at http://www.cs.purdue.edu/coast/archive/data/categ24.html).

(List continued on next page.)

Primary Examiner—Ramesh Patel
(74) Attorney, Agent, or Firm—Baker Botts L.L.P.

(57) ABSTRACT

A system for consolidating and sorting event data include a computing platform communicatively coupled to a computer readable medium and a network. The computer readable medium may store an application that includes at least one node mapped into a tree. The at least one node may have a data element reference including a pointer to a data element that includes event data received via the network. In addition, the node may have a row indicator node count, a least child reference, a greatest child reference, a lesser sibling reference, a greatest sibling reference, a parent reference, and a status manager reference.

29 Claims, 3 Drawing Sheets

OTHER PUBLICATIONS

"Use of A Taxonomy of Security Faults," T. Aslam, et al., pp. 1–10, (found at http://www.cs.purdue.edu/coast/archive/data/categ24.html), Sep. 1996.

"Artificial Intelligence and Intrusion Detection: Current and Future Directions," Jeremy Frank, pp. 1–12, (found at http://www.cs.purdue.edu/coast/archive/data/categ24.html), Jun. 1994.

"ASAX Conceptual Overview," ASAX Brochure, A. Mounji, (found at http://www.cs.purdue.edu/coast/archive/data/categ24.html).

"GrIDS–A Graph Based Intrusion Detection System For Large Networks," S. Staniford–Chen, et al., 10 pages, (found at http://www.cs.purdue.edu/coast/archive/data/categ24.html).

"A Pattern Matching Model For Misuse Intrusion Detection," S. Kumar, et al., pp. 1–11, (found at http://www.cs.purdue.edu/coast/archive/data/categ24.html), Jun. 1994.

"An Application of Pattern Matching in Intrusion Detection", S. Kumar, et al., pp. 1–55, (found at http://www.cs.purdue.edu/coast/archive/data/categ24.html), Mar. 1994.

"A Software Architecture to Support Misuse Intrusion Detection", S. Kumar, et al., pp. 1–17, (found at http://www.cs.purdue.edu/coast/archive/data/categ24.html).

"Applying Genetic Programming to Intrusion Detection", M. Crosbie, et al., pp. 1–8, (found at http://www.cs.purdue.edu/coast/archive/data/categ24.html).

"Defending a Computer System Using Autonomous Agents", M. Crosbie, et al., pp. 1–11, (found at http://www.cs.purdue.edu/coast/archive/data/categ24.html), Mar. 1994.

"Analysis Of An Algorithm For Distributed Recognition And Accountability", C. Ko, et al., pp. 1–11, (found at http://www.cs.purdue.edu/coast/archive/data/categ24.html).

"A Standard Audit Trail Format", Matt Bishop, 10 pages, (found at http://www.cs.purdue.edu/coast/archive/data/categ24.html), 1995.

Master Thesis entitled USTAT A Real–time Intrusion Detection System for UNIX, University of California, K. Ilgun, pp. 1–204, (found at http://www.cs.purdue.edu/coast/archive/data/categ24.html), Nov. 1992.

"A Weakness in the 4.2BSD Unix TCP/IP Software", R. Morris, 4 pages, (found at http://www.cs.purdue.edu/coast/archive/data/categ30.html), Feb. 1985.

"The Architecture and Implementation of Network–Layer Security Under Unix", J. Ioannidis, et al., 11 pages, (found at http://www.cs.purdue.edu/coast/archive/data/categ30.html).

"A Best–Case Network Performance Model", S.M. Bellovin, pp. 1–10, (found at http://www.cs.purdue.edu/coast/archive/data/categ30.html), Feb. 1992.

"OARnet Security Procedures", K. Varadhan, pp. 1–14, (found at http://www.cs.purdue.edu/coast/archive/data/categ30.html), Sep. 1992.

"Paving The Road To Network Security Or The Value Of Small Cobblestones", H. Orman, et al., pp. 1–17, (found at http://www.cs.purdue.edu/coast/archive/data/categ30.html), May 1994.

"Packets Found on an Internet", S. Bellovin, pp. 1–6, (found at http://www.cs.purdue.edu/coast/archive/data/categ30.html), Aug. 1993.

"Security Problems in the TCP/IP Protocol Suite", S.M. Bellovin, (reprinted from Computer Communication Review, vol. 19, No. 2, pp. 32–48) pp. 1–17, Apr. 1989.

"A Security Analysis of the NTP Protocol", Matt Bishop, pp. 1–20, (found at http://www.cs.purdue.edu/coast/archive/data/categ30.html), 1990.

"WAN–hacking with AutoHack–Auditing Security Behind the Firewall", Alec Muffett, 14 pages, (found at http://www.cs.purdue.edu/coast/archive/data/categ30.html), Jun. 1995.

"ACMAINT: An Account Creation and Maintenance System for Distributed UNIX Systems", D.A. Curry, et al., pp. 1–9, (found at http://www.cs.purdue.edu/coast/archive/data/categ30.html), Oct. 1990.

"NFS Tracing By Passive Network Monitoring", Matt Blaze, 11 pages, (found at http://www.cs.purdue.edu/coast/archive/data/categ30.html).

"Pseudo–Network Drivers and Virtual Networks", S.M. Bellovin, 15 pages, (found at http://www.cs.purdue.edu/coast/archive/data/categ30.html).

Masters Thesis entitled "Addressing Weaknesses In The Domain Name System Protocol", Purdue University, Christoph Schuba, pp. 1–87., (found at http://www.cs.purdue.edu/coast/archive/data/categ30.html), Aug. 1993.

"Countering Abuse of Name–Based Authentication", C.L. Schuba, et al., pp. 1–21., (found at http://www.cs.purdue.edu/coast/archive/data/categ30.html).

"The 'Session Tty' Manager", S.M. Bellovin, pp. 1–16, (found at http://www.cs.purdue.edu/coast/archive/data/categ30.html).

"Secure RPC Authentication (SRA) for Telnet and FTP", D.R. Safford, et al., pp. 1–5 (found at http://www.cs.purdue.edu/coast/archive/data/categ30.html), 1993.

"A Reliable and Secure UNIX Connection Service", D. Draheim, et al., pp. 1–12, (found at http://www.cs.purdue.edu/coast/archive/data/categ30.html).

"TCP Wrapper Network Monitoring, Access Control, and Booby Traps", Wietse Venema, 8 pages., (found at http://www.cs.purdue.edu/coast/archive/data/categ30.html).

"Characteristics of Wide–Area TCP/IP Conversations", R. Cáceres, et al., pp. 1–12, (found at http://www.cs.purdue.edu/coast/archive/data/categ30.html).

"A Unix Network Protocol Security Study: Network Information Service", D.K. Hess, et al., 5 pages, (found at http://www.cs.purdue.edu/coast/archive/data/categ30.html).

"Insertion, Evasion, and Denial of Service: Eluding Network Intrusion Detection", T.H. Ptacek et al., pp. 1–63, Jan. 1998.

"A Method to Detect Intrusive Activity in a Networked Environment", L.T. Heberlein et al., *Proc. of the 14th National Computer Security Conference*, Oct. 1991, pp. 362–371., (found at http://seclab.cs.ucdavis.edu/papers.html), 1991.

"Internetwork Security Monitor: An Intrusion–Detection System for Large–Scale Networks", L.T. Heberlein et al., *Proc. of the 15th National Computer Security Conference*, Oct. 1992, pp. 262–271, 1992.

"Comparison Between Internet Security Scanner (ISS) 1.x and Internet Scanner 3.2", by Internet Security Systems., (found at http://www.iss.net), 1996.

"Automated Tools for Testing Computer System Vulnerability", W.T. Polk, 40 pages, Dec. 1992.

The Design of GrIDS: A Graph–Based Intrusion Detection Systems, S. Cheung et al., *U.C. Davis Computer Science Department Technical Report SCE–99–2, 1999*, pp. 1–47, (found at http://seclab.cs.ucdavis.edu/papers.html), Jan. 26, 1999.

"Luby–Rackoff Backwards: Increasing Security by Making Block Ciphers Non–Invertible", M. Bellare, et al., *Advances in Cryptology–Eurocrypt 98 Proceedings, Lecture Notes in Computer Science,* vol. 1403 Springer–Verlat (1998) pp. 1–27, (found at http://seclab.cs.ucdavis.edu/papers.html), Oct. 17, 1998.

"Detecting Disruptive Routers: A Distributed Network Monitoring Approach", K.A. Bradley, et al., *Proceedings of the 1998 IEEE Symposium on Security and Privacy,* Oakland, CA, pp. 115–124 (found at http://seclab.cs.ucdavis.edu/papers.html), May 1998.

"Stack and Queue Integrity on Hostile Platforms", P.T. Devanbu, et al., *IEEE Symposium on Security and Privacy,* Oakland CA, (found at http://seclab.cs.ucdavis.edu/papers.html), 1998.

"Techniques for Trusted Software Engineering", P.T. Devanbu et al., *Proceedings of the 20th International Conference on Software Engineering,* Kyoto, Japan, (found at http://seclab.cs.ucdavis.edu/papers.html), 1998.

"Data Level Inference Detection in Database Systems", R.W. Yip et al., *Proceedings of the 11th IEEE Computer Security Foundations Workshop,* Rockport, Massachusetts, (found at http://seclab.cs.ucdavis.edu/papers.html), 1998.

"The Design and Implementation of a Data Level Database Inference Detection System",. Yip et al., *Proceedings of the Twelfth Annual IFIP WG 11.3 Working Conference on Database Security,* Chalkidiki, Greece 14 pages, (found at http://seclab.cs.ucdavis.edu/papers.html), 1998.

"Theft of Information in the Take–Grant Protection Model", Matt Bishop, 35 pages, *Journal of Computer Security* 4(4):(1996), (found at http://seclab.cs.ucdavis.edu/papers.html), Mar. 13, 1997.

"Information Survivability, Security, and Fault Tolerance", Matt Bishop, position paper for the Information Survivability Workshop *Journal of Computer Security #6*) 1 pages, (found at http://seclab.cs.ucdavis.edu/papers.html), 1997.

"Teaching Computer Security", Matt Bishop, position paper for the *Workshop on Education in Computer Security,* Monterey CA, 3 pages, (found at http://seclab.cs.ucdavis.edu/papers.html), 1997.

"Protecting Routing Infrastructures from Denial of Service Using Cooperative Intrusion Detection", S. Cheung et al., *Proc. new Security Paradigms Workshop,* Cumbria, UK 13 pages, (found at http://seclab.cs.ucdavis.edu/papers.html), 1997.

"An Efficient Message Authentication Scheme for Link State Routing", S. Cheung, *Proc. 13th annual Computer Security Applications Conference,* San Diego, CA, 9 pages, (found at http://seclab.cs.ucdavis.edu/papers.html), 1997.

"Cryptographic Verification of Test Coverage Claims", P. Devanbu et al., *Proceedings, Fifth ACM/SIGSOFT Conference on Foundations of Software Engineering* Zurich, Switzerland) (found at http://seclab.cs.ucdavis.edu/papers.html), 1997.

"Property–Based Testing; A New Approach to Testing for Assurance", Fink et al., *ACM SIGSOFT Software Engineering Notes,* 22(4):, (found at http://seclab.cs.ucdavis.edu/papers.html), 1997.

"Checking for Race Conditions in File Accesses", Bishop et al., *Computing Systems* 9(2), (found at http://seclab.cs.ucdavis.edu/papers.html), 1996.

"An Isolated Network for Research", Bishop et al., *The 19th NISSC,* pp. 1–9, (found at http://seclab.cs.ucdavis.edu/papers.html), 1996.

"Goal–Oriented Auditing and Logging", Bishop et al., submitted to IEEE Transactions on Computing Systems, (found at http://seclab.cs.ucdavis.edu/papers.html), 1996.

"Extending The Take–Grant Protection System", J. Frank et al., The IEEE Oakland Conference on Research in Security and Privacy., (found at http://seclab.cs.ucdavis.edu/papers.html), Dec. 5, 1996.

Network Security Via Reverse Engineering of TCP Code: Vulnerability Analysis and Proposed Solutions, Guha et al., *Proc. of the IEEE Infocom '96 ,* San Francisco, CA (found at http://seclab.cs.ucdavis.edu/papers.html), 1996.

"Attack Class: Address Spoofing", Heberlein et al., The 19th National Information Systems Security Conference, (found at http://seclab.cs.ucdavis.edu/papers.html), 1996.

PhD. Theses entitled Execution Monitoring Of Security–Critical Programs In A Distributed System; A Specification-–Based Approach, Calvin Cheuk Wang Ko, 111 pages, (found at http://seclab.cs.ucdavis.edu/papers.html), 1996.

"A Methodology for Testing Intrusion Detection Systems", Puketza et al., *IEEE Transactions on Software Engineering,* vol. 22, No. 10, (found at http://seclab.cs.ucdavis.edu/papers.html), 1996.

"The Exact Security of Digital Signatures–How to Sign with RSA and Rabin", Bellare et al. Earlier version appears in *Advances in Cryptology–Eurocrypt '96,* LNCS vol. 1070, U. Maurer ed., Springer–Verlag, pp. 399–416, (found at http://seclab.cs.ucdavis.edu/papers.html), 1996.

"How to Protect DES Against Exhaustive Key Search", Kilian et al., Advances in Cryptology—CRYPTO '96., (found at http://seclab.cs.ucdavis.edu/papers.html), 1996.

"GrIDS–A Graph Based Intrusion Detection System For Large Networks", Staniford–Chen et al., *The 19th NISSC.* 10 pages, (found at http://seclab.cs.ucdavis.edu/papers.html), 1996.

"NetKuang–A Multi–Host Configuration Vulnerability Checker", Zerkle et al., *Proc. of the 6th USENIX Security Symposium,* San Jose, CA., (found at http://seclab.cs.ucdavis.edu/papers.html), 1996.

Abstract entitled Theft of Information in the Take–Grant Protection Model, Matt Bishop, *Journal of Computer Security, vol. 3, No. 4,* (found at http://seclab.cs.ucdavis.edu/papers.html), 1995.

"Improving System Security via Proactive Password Checking", Matt Bishop, *Computers & Security,* vol. 14, No. 3, pp. 233–249, (found at http://seclab.cs.ucdavis.edu/papers.html), 1995.

"Simulating Concurrent Intrusions for Testing Intrusion Detection Systems: Parallelizing Intrustions", Chung et al., *Proc. of the 1995 NISSC,* Baltimore, MD, 11 pages, (found at http://seclab.cs.ucdavis.edu/papers.html), 1995.

"Network Security Monitor", L. Todd Heberlein, *Lawrence Livermore National Laboratory project deliverable,* (found at http://seclab.cs.ucdavis.edu/papers.html), 1995.

"Audit Log Analysis Using the Visual Audit Browser Toolkit", Hoagland et al., *U.C. Davis Computer Science Department Technical Report CSE–95–11,* (found at http://seclab.cs.ucdavis.edu/papers.html), 1995.

"MCF: A Malicious Code Filter", R.W. Lo et al., *Computers & Security,* (1995) vol. 14, No. 6. (27 pages.), (found at http://seclab.cs.ucdavis.edu/papers.html), 1995.

"Bucket Hashing and its Application to Fast Message Authentication", Phillip Rogaway, Acvances in Cryptology—CRYPTO '95, (found at http://seclab.cs.ucdavis.edu/papers.html), 1995.

"Provably Secure Session Key Distribution–The Three Party Case", Bellare et al., *Proc., of the 27th Annual ACM Symposium on Theory of Computing,* Las Vegas, NV, (found at http://seclab.cs.ucdavis.edu/papers.html), 1995.

"XOR MACs: New Methods for Message Authentication Using Finite Pseudorandom Functions", Bellare et al., *Advances in Cryptology—CRYPTO '95,* (found at http://seclab.cs.ucdavis.edu/papers.html), Oct. 1995.

"Holding Intruders Accountable on the Internet", Staniford–Chen et al., *Proc. of the 1995 IEEE Symposium on Security and Privacy,* Oakland, CA, (11 pages) (found at http://seclab.cs.ucdavis.edu/papers.html), 1995.

"LAFS: A Logging and Auditing File System", Christopher Wee, *Proc. of the 11th Computer Security Applications Conference,* 10 pages, (found at http://seclab.cs.ucdavis.edu/papers.html), 1995.

"Towards a Property–based Testing Environment with Applications to Security–Critical Software", Fink et al., *Proc. of the 4th irvine Software Symposium.* 10 pages, (found at http://seclab.cs.ucdavis.edu/papers.html),1994.

"Property–based Testing of Privileged Programs", Fink et al., *Proc. of the 10th Annual Computer Security Applications Conference,* Orlando, FL. 10 pages, (found at http://seclab.cs.ucdavis.edu/papers.html), Dec. 1994.

"Arificial Intelligence and Intrusion Detection: Current and Future Directions", Jeremy Frank, *Proc. of the 17th National Computer Security Conference.* 12 pages, (found at http://seclab.cs.ucdavis.edu/papers.html), 1994.

"Automated Detection of Vulnerabilities in Privileged Programs by Execution Monitoring", Ko et al., *Proc. of the 10th Annual Computer Security Applications Conference,* Orlando, FL. (found at http://seclab.cs.ucdavis.edu/papers.html), 1994.

"Common Techniques in Fault–Tolerance and Security", Levitt et al., *Proc. of the Dependable Computing for Critical Applications 4,* San Diego, CA. 4 pages, (found at http://seclab.cs.ucdavis.edu/papers.html), 1994.

"Network Intrusion Detection", Mukherjee et al., *IEEE Network,* May–Jun. 1994, vol. 8, No. 3, pp. 26–41. (found at http://seclab.cs.ucdavis.edu/papers.html), 1994.

"A New Suggestion for How to Encrypt with RSA", Bellare et al., *Eurocrypt '94,* 20 pages, (found at http://seclab.cs.ucdavis.edu/papers.html), 1994.

"The Security of Cipher Block Chaining", Bellare et al., *Advances in Cryptology—CRYPTO '94,* Santa Barbara CA. (19 pages.) (found at http://seclab.cs.ucdavis.edu/papers.html), 1994.

"Analysis Of An Algorithm For Distributed Recognition And Accountability", Ko et al., *Proc. 1st ACM Conference on Computer and Communication Security.* Fairfax, VA, Nov. 1993, 11 pages, (found at http://seclab.cs.ucdavis.edu/papers.html), 1993.

"Entity Authentication and Key Distribution". Bellare et al., *Advances in Cryptology—CRYPTO '93,* Santa Barbara, CA, Aug. 1993, pp. 232–249. (found at http://seclab.cs.ucdavis.edu/papers.html), Aug. 1993.

"Random Oracles are Practical: A Paradigm for Designing Efficient Protocols", Bellare et al., *Proc. of the 1st ACM Conference on Computer and Communication Security,* Fairfax, VA, Nov. 1993, pp. 1545–164. (found at http://seclab.cs.ucdavis.edu/papers.html), 1993.

"A Software–Optimized Encryption Algorithm", Rogaway et al., *Proc. of the Fast Software Encryption Cambridge Security Workshop,* Cambridge, UK (16 pages.) (found at http://seclab.cs.ucdavis.edu/papers.html), 1993.

"Anatomy of a Proactive Password Changer", Matt Bishop, *Proc. of the UNIX Security Symposium III* Baltimore, MD, 15 pages. (found at http://seclab.cs.ucdavis.edu/papers.html), 1992.

DIDS (Distributed Intrusion Detection System)–Motivation, Architecture, and An Early Prototype, Snapp et al., *Proc. 14th National Computer Security Conference,* Washington, DC (9 pages.) (found at http://seclab.cs.ucdavis.edu/papers.html), 1991.

"Proactive Password Checking", Matt Bishop, *Proc. of the 7th International Conference on Information Security,* May 1991, pp. 169–181. (found at http://seclab.cs.ucdavis.edu/papers.html), 1991.

Dissertation entitled Issues in Debugging Sequential and Concurrent Programs: Methods, Techniques, and Implementation, University of California, Wingshun Wilson Ho, 191 pages. (found at http://seclab.cs.ucdavis.edu/papers.html), 1992.

Abstract entitled "Collaboration Using Roles" by M. Bishop, *Software—Practice and Experience,* vol. 20, No. 5, May 1990. (found at http://seclab.cs.ucdavis.edu/papers.html), May 1990.

Abstract entitled "An Extendable Password Checker" by M. Bishop, *Proc. UNIX Security II* Portland, OR, 27–28 Aug. 1990, pp. 15–16, (found at http://seclab.cs.ucdavis.edu/papers.html), 1990.

Abstract entitled "A Security Analysis of the NTP Protocol Version 2" by M. Bishop, Dec. 1990.

Abstract entitled "A Little Knowledge Goes a Long Way: Faster Detection of Compromised Data in 2–D Tables" by D. Gusfield, *Proc. of the 1990 IEEE Symposium on Research in Security and Privacy,* Oakland, CA, May 7–9, 1990, pp. 86–94, (found at http://seclab.cs.ucdavis.edu/papers.html), May 1990.

Abstract entitled "A Network Security Monitor" by L.T. Heberlein, G.V. Dias, K.N. Levitt, B. Mukherjee, and others *Proc. of the 1990 IEE Symposium on Research in Security and Privacy,* Oakland, CA, May 7–9, 1990, pp. 296–304, (found at http://seclab.cs.ucdavis.edu/papers.html), May 1990.

Abstract entitled "Static Analysis Virus Detection Tools for UNIX Systems" by P. Kerchen, et al., *Proc. 13th National Computer Security Conference,* Washington, DC, Oct. 1–4, 1990, pp. 350–365 (found at http://seclab.cs.ucdavis.edu/papers.html), Oct. 1990.

Abstract entitled "Security with Low Communication Overhead" by D. Beaver, et al., *Proc. Advances in Cryptology–CRYPTO '90,* Santa Barbara, CA Aug. 11–15, Aug., 1990, pp. 62–76, (found at http://seclab.cs.ucdavis.edu/papers.html), Aug. 1990.

Abstract entitled "The Round Complexity of Secure Protocols" by D. Beaver, et al., *Proc. of the 22nd Annual ACM Symposium on Theory of Computing,* Baltimore, MD, May 14–16, 1990, pp. 503–513. (found at http://seclab.cs.ucdavis.edu/papers.html), May 1990.

Abstract entitled "PACLs: An Access Control List Approach to Anti–Viral Security" by D.R. Wichers, et al., *Proc. 13th National Computer Security Conference,* Washington, DC, Oct. 1–4, 1990, pp. 340–349. (found at http://seclab.cs.ucdavis.edu/papers.html), Oct. 1990.

Abstract entitled "Verification of Secure Distributed Systems in Higher Order Logic: A Modular Approach Using Generic Components" by J. Alves–Foss, K. Levitt, *Proc. of the 1991 IEEE Computer Society Symposium on Research in Security and Privacy,* Oakland CA May 20–22, 1991, pp. 122–135. (found at http://seclab.cs.ucdavis.edu/papers.html), May 1991.

Abstract entitled "An Authentication Mechanism for USENET" by M. Bishop, *Proc. of the Winter 1991 USENIX Conference.* Jan. 21–25, 1991, pp. 281–287, (found at http://seclab.cs.ucdavis.edu/papers.html), Jan. 1991.

Abstract entitled "Password Management" by M. Bishop, *COMPCON Spring '91. Digest of Papers,* San Francisco, CA, Feb. 25–Mar. 1, 1991, pp. 167–169. (found at http://seclab.cs.ucdavis.edu/papers.html), Mar. 1991.

Abstract entitled "Teaching Computer Security" by M. Bishop, May 1993.

Abstract entitled "Recent Changes to Privacy Enhanced Electronic Mail" by M. Bishop, *Journal of Internetworking: Research and Experience.* vol. 4, No. 1, Mar. 1993, pp. 47–59. (found at http://seclab.cs.ucdavis.edu/papers.html), Mar. 1993.

Abstract entitled "A Modified Random Perturbation Method for Database Security" by P. Tendick, N. Matloff, *ACM Transactions on Database Systems,* Mar. 1994, vol. 19, No. 1, pp. 47–63, (found at http://seclab.cs.ucdavis.edu/papers.html), Mar. 1994.

Short presentation entitled "Intrusion Detection for Network Infrastructures" by S. Cheung, K.N. Levitt, C. Ko. *The 1995 IEEE Symposium on Security and Privacy,* Oakland CA, May 1995.

Master Thesis entitled "Paradigms for the Reduction of Audit Trails" by B. Wetmore, downloaded from http:seclab.cs.ucdavis.edu/papers.html, 1993.

"Open System Security—An Architectural Framework" by Arto T. Karila, (found at http://www/cs.purdue.edu/coast/archive/data/categ.30.html), Jun. 1991.

Product description for "Oil Change" located on the Internet at http://store.mcaffe.com/product.asp?ProductID=28&CCategoryID–12, pp. 1–2.

NetRanger 1.3 User's Guide, Copyright © 1997 by Wheel-Group Corporation, NetRanger product first available summer of 1996.

"Information Security and Privacy in Network Environments," by U.S. Office of Technology Assessment, OTA–TCT–606 (Washington DC: US Government Printing Office), Sep. 1994.

"A Few Attacks on the Zero Knowledge State in Novell's Netware" by Greg Miller, pp. 1–11, (found at http://www.cs.purdue.edu/coast/archive/data/categ30.html), Jul. 30, 1996.

"Introduction to Algorithms," by Thomas H. Cormen, Charles E. Leiserson, Ronald L. Rivest, Chap. 34, pp. 853–885, Copyright # 1990.

* cited by examiner

| COUNT | NAME | SOURCE ADDRESS | DEST ADDRESS | SOURCE PORT | DEST PORT | SOURCE LOC | DEST LOC | SIG ID |
|---|---|---|---|---|---|---|---|---|
| 6 | ICMP ECHO REQ | + | + | + | + | + | + | + |
| 6 | ICMP ECHO RPLY | + | + | + | + | + | + | + |
| 3 | ICMP FLOOD | + | + | + | + | + | + | + |
| 767 | ICMP UNREACHABLE | 171.69.162.158 | 172.21.172.6 | 0 | 0 | OUT | IN | 2001 |
| 15853 | | 171.69.162.165 | 172.21.172.12 | 0 | 0 | OUT | IN | 2001 |
| 239 | | 171.69.162.177 | 172.21.172.4 | 0 | 0 | OUT | IN | 2001 |
| 237 | | | 172.21.172.11 | 0 | 0 | IN | IN | 2001 |
| 15877 | | 172.21.172.1 | 172.21.172.4 | 0 | 0 | IN | OUT | 2001 |
| 186 | | 172.21.172.11 | 172.69.162.177 | 0 | 0 | OUT | IN | 2001 |
| 213 | | 198.92.1.137 | 172.21.172.100 | 0 | 0 | OUT | IN | 2001 |
| 271 | | 198.92.1.138 | 172.21.172.100 | 0 | 0 | OUT | IN | 2001 |
| 2491 | | 198.92.2.137 | 172.21.172.100 | 0 | 0 | OUT | IN | 2001 |
| 13 | STRING MATCH | + | + | + | + | + | + | + |
| 6 | TCP CONN REQ | + | + | + | + | + | + | + |
| 20151 | UDP PACKET | + | + | + | + | + | + | + |

SYSTEM AND METHOD FOR CONSOLIDATING AND SORTING EVENT DATA

TECHNICAL FIELD OF THE INVENTION

This invention relates in general to the field of computer systems, and more particularly to a system and method for consolidating and sorting event data.

BACKGROUND OF THE INVENTION

Computer networks have become increasingly important tools for communicating public and private information between and within distributed locations. Many computer users are familiar with the Internet, which may be described as a large public computer network. Similarly, many computer users are familiar with private computer networks, such as company intranets, local area networks (LANs), and wide area networks (WANs). These more private computer networks generally limit network access on a user by user basis by funneling communicated data through dedicated lines and/or by controlling network access through passwords, encryption or other security measures.

One potential roadblock to reliable and secure network communication is posed by hackers or other unauthorized users disrupting or interfering with network resources. The danger posed by unauthorized access to a computer network can vary from simple embarrassment to substantial loss of resources. To help guard against these unwanted disruptions, several computer network managers have turned to network intrusion detection systems.

Network intrusion detection is a process that identifies and responds to misuse or policy violations on a network. By placing sensor devices at determined points on a network, network traffic is monitored and compared against patterns or "signatures" that represent suspicious activity, misuse, or actual attacks. A sensor monitoring a network can send alerts to a director, to a security management system, and, under appropriate circumstances, to network equipment such as routers and firewalls.

Sensors included in some conventional intrusion detection systems will automatically and quickly respond in a user-defined manner, such as sending an alert. The sending of an alert may involve the creation of an event. In most cases, an event is a set of data elements that adheres to a known format and represents that something has occurred. In a network intrusion detection system, an event could indicate any number of occurrences. For example, an event may indicate that a program or computer has failed, that a computer's configuration has changed, or that an unauthorized user is attempting to break into a computer on the network.

In practice, events are usually generated by computerized processes and are meant to be viewed and perhaps acted upon. Events may be generated in several different types of computer systems. For example, an event may be generated by and remain within a stand-alone computer or an event may be generated by an intrusion detection system sensor and communicated across a network.

In a typical network-based operation, for example, an intrusion detection system and its respective sensors may analyze network packet headers to make security decisions based on source, destination, and packet type. Intrusion detection systems may also analyze packet data to make decisions based on the actual data being transmitted. These systems tend to scale well for network protection because the number of actual workstations, servers or user systems on the network is not critical—the amount of traffic is what matters.

Unfortunately, the volume of traffic and the number of events generated as a result of that traffic creates a number of challenges for conventional intrusion detection systems. For example, conventional intrusion detection systems, even those employing an event browser, have a difficult time providing a useable display of events. A conventional event browser, for example, may display events in a scrolling list. As the quantity of events presented on the scrolling list increases, the useability of the list tends to decrease. The display often includes too much information, and the information changes too quickly. In fact, in some cases, a scrolling list of events may scroll so quickly that events scroll off the "top" of the screen before they can be read.

This scrolling problem and other problems associated with conventional solutions may be magnified by the fact that a detection system's sensors can be placed around the globe and configured to report back to a central site. While this may enable an individual at the central site to support a large enterprise, the individual will likely be inundated with events.

SUMMARY OF THE INVENTION

In accordance with the present disclosure, a system and method for consolidating and sorting event data are disclosed that provide significant advantages over prior developed techniques. In addition to providing an effective tool for consolidating and sorting event data, the disclosed embodiments allow for the presentation of a more useable display of event data.

According to one aspect of the present disclosure, a system incorporating teachings of the present disclosure may include a computing platform communicatively coupled to a computer readable medium and a network. The computer readable medium may store an application that includes at least one node mapped into a tree. The at least one node may have a data element reference including a pointer to a data element that includes event data received via the network. In addition, the node may have a row indicator node count, a least child reference, a greatest child reference, a lesser sibling reference, a greatest sibling reference, a parent reference, and a status manager reference.

According to another aspect of the present disclosure, a method for consolidating and sorting event data may involve providing event data via a network to an event sorter. The event sorter may manage a tree that has a plurality of nodes representing earlier received event data. The method may also include creating a node having a data element reference with a pointer to a data element representing the provided event data and identifying a location within the tree in which to place the created node. In some embodiments, a method incorporating teachings of the present invention may also include placing the node at the identified location.

The disclosed system and method provide several technical advantages over conventional approaches. For example, the present invention may allow for consolidation of events into a viewable and expandable spreadsheet. As new events are reported, a system incorporating teachings of the present invention may present a spreadsheet to a user that updates in near real time.

In addition, the disclosed sorting scheme may allow for the presentation of event-related information including, for example, time of event, type of event, and severity of event, in a format that is more useable than formats available with conventional systems. For example, a system incorporating teachings of the present invention may help eliminate the scroll off problems associated with conventional systems.

Other technical advantages will be apparent to those of ordinary skill in the art in view of the following specification, claims, and drawings.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 3b shows one embodiment of sample data that may be mapped into the n-ary tree of FIG. 3a;

FIG. 4b depicts one embodiment of potential class attributes and methods for the objects of FIG. 4a.

DETAILED DESCRIPTION OF THE INVENTION

Preferred embodiments and their advantages are best understood by reference to FIGS. 1 through 4b, wherein like numbers are used to indicate like and corresponding parts.

Figure 1:
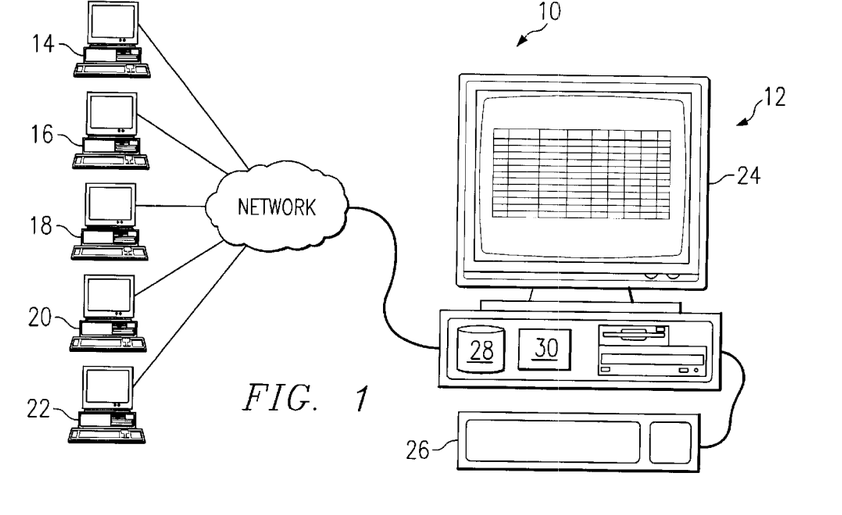
FIG. 1 shows a computer network with one embodiment of a network intrusion detection system that incorporates teachings of the present invention.

FIG. 1 shows a computer network 10 with a network intrusion detection console 12 communicatively coupled to it. Computer network 10 may include any number of attached computer systems. As depicted, computer network 10 has five attached computer systems 14, 16, 18, 20 and 22. The attached computer systems may be, for example, desk tops, work stations, or servers.

Computer network 10 may have interspersed within it sensors or other devices capable of sending event information to intrusion detection system console 12. Console 12 may, for example, include a monitor 24, a keyboard 26, a computer readable medium 28, and a computing platform 30 communicatively coupled to computer readable medium 28 and computer network 10. In one embodiment of the present invention, computer readable medium 28 may be storing an application. In preferred embodiments, the application may be an object-oriented application.

Computing platform 30 may be made up of several different components. For example, computing platform 30 may include a motherboard, a microprocessor, or any component capable of executing an application.

As mentioned above, computer readable medium 28 may be storing an object-oriented application. Within an object-oriented application, classes and subclasses may be used to group and define objects, which may be referred to as instances of classes. Objects often share common characteristics such as the same attributes and/or methods. Typically, objects combine the attributes and methods of a class with actual data for a specific item such that the object represents that specific item. As such, an object is what a programmer may actually use and manipulate in an application or program.

Objects communicate using messages. Thus, if one object needs to know the status of another object, the first object can send a message to the other object. The other object then would respond with status information. In practical terms, "sending a message" may be the equivalent of calling a method that belongs to the other object. Often, objects have references or pointers to related objects.

A general benefit of object-oriented programming is the facilitation of code reuse. Classes achieve reusability by encapsulating attributes and methods. The encapsulation helps hide implementation. Thus, when a programmer writes a program to use an object of a class, all that the programmer may see is the methods that are defined for the object in its class.

In one embodiment of the present invention, computing platform 30 may use an object-oriented program stored in computer readable medium 28 to facilitate presentation of information on monitor 24. The information presented may represent events generated during the monitoring of network data on computer network 10. For example, if an attack is detected on computer network 10, a sensor may provide notice of the attack to console 12 as an event. The event may be placed into an n-ary tree, such as the tree depicted in FIG. 3a, and a spreadsheet displayed on monitor 24 may be updated so as to indicate the received event.

One potential use for a graphical user interface and consolidating/sorting system incorporating teachings of the present invention may relate to intrusion detection. An intrusion detection system incorporating teachings of the present invention may accept event information and analyze it to identify malicious or unauthorized use of network resources. This analysis may involve looking for specific patterns or signatures that indicate malicious activity on the network.

Some events are more serious than other events, which is to say that different events can represent occurrences having differing levels of importance, danger and severity. Furthermore, sometimes it is a combination of events, rather than a single event, that can indicate a noteworthy condition. When large numbers of events are present, which is often the case when automated systems are generating the events, it can be difficult for a human to find critical events and to find important patterns in the events.

An intrusion detection system incorporating teachings of the present invention may help ensure that large numbers of events, which may number in the hundreds of thousands or more, may be viewed, manipulated, and understood easily by a user. The disclosed system and method may help find "patterns" in the data of multiple events and display the patterns rather than displaying every last event that was received. One embodiment for displaying these patterns may include spreadsheets like the spreadsheet of FIG. 2.

Figure 2:
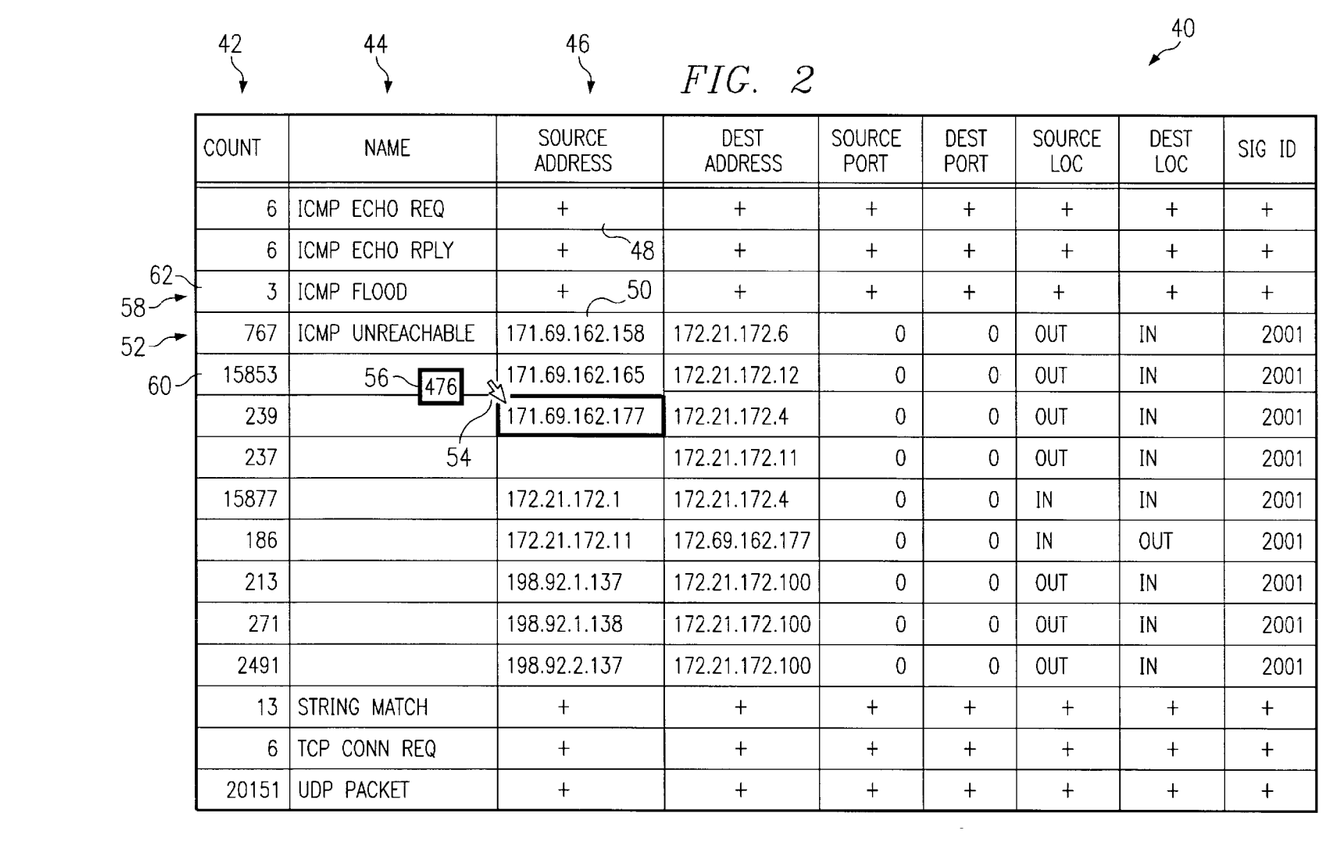
FIG. 2 shows one embodiment of a spreadsheet that may be generated by a system incorporating teachings of the present invention.

FIG. 2 shows one embodiment of a spreadsheet 40 that may be generated by a system incorporating teachings of the present invention. Traditionally, event displays present events in a scrolling list. Often, each event will fill one row in a list, and each data element within the event will fill one cell in the row. This linear display of events may be useful when there are small numbers of events, because a scrolling list makes viewing, sorting and searching relatively easy. For example, it may, in certain circumstances, be convenient for a user to scan down a column to find a particular data element the user is interested in. Unfortunately, when there are many events, or when events come in quickly, this type of display may not be practical. Events may scroll off the "top" of the screen before they can be read. In addition, reading a list of thousands of events may at some point become overly tedious.

Spreadsheet 40 may be used to present events in event groups. These event groups or consolidated events may help reduce the amount of information displayed to a user and reduce the amount of change on a screen during an event flood. Event grouping may be achieved by mapping data elements onto a tree structure, and then mapping the tree structure onto a spreadsheet grid. Each data element or field in an event may be represented by a node in the tree, and a set of nodes from the root of the tree down to a leaf may be the complete set of data elements in a received event.

Spreadsheet 40 may employ several visual schemes to indicate additional hidden information. For example, in spreadsheet 40's grid, a cell's background color may provide information about the cell. In one embodiment, if a cell's background is white, then one data element may be associated with the cell. If a cell's background is gray, then the cell may represent multiple data elements. If a cell is gray and has a "+" in it, then there may be multiple data elements for that cell and the cell may be expanded. The multiple data elements may be exposed by expanding or double clicking on the cell.

For example, as depicted in spreadsheet 40 of FIG. 2, count column 42 indicates that there are six events of the type named "ICMP Echo Req". The name of the event type may be displayed in column 44. As indicated in column 46, there may be more than one source address associated with the six events that have the name "ICMP Echo Req". As such, source address cell 48 may have a gray background color and may display a "+". As depicted, spreadsheet 40 shows an expanded cell. Cell 50, depicted at the intersection of column 46 and row 52, has been expanded for "ICMP Unreachable" events.

In addition to indicating expandability, spreadsheet 40 may indicate an event count with any of several mechanisms. For example, the number of events in a group may be displayed in column 42, the "Count" column. A given cell in this column may provide an updated and near real time count of events in a row containing the given cell, for example row 52, which as displayed has a count of 767. As depicted, the "767" may not indicate that there are 767 "ICMP Unreachable" events, but rather that there are 767 events whose name is "ICMP Unreachable" and whose Source Address is "171.69.162.158".

Another mechanism for indicating count may involve a tool-tip count. In embodiments employing a tool-tip count, moving an on screen indicator, such as a mouse pointer, onto a given cell may cause spreadsheet 40 to provide an updated and near real time count of events in a branch that spans multiple rows.

In one embodiment of a tool-tip counter, placing a mouse pointer over the cell a user may be interested in causes a count to pop up that indicates how many events "pass" through the pointed to part of an event data tree. For example, in spreadsheet 40, if a user puts mouse pointer 54 on source address "171.69.162.177", tool-tip count window 56 may be displayed with a count of 476. The 476 may indicate that there are 476 events that have the Name "ICMP Unreachable" and the Source Address "171.69.162.177". The 476 count may represent a combination of the 239 events with the fields "ICMP Unreachable", "171.69.162.177" and "172.21.172.4" and the 237 events with the fields "ICMP Unreachable", "171.69.162.177" and "172.21.172.11".

In addition to various count indicators, spreadsheet 40 may have other functionalities. For example, spreadsheet 40 may allow for the expansion of cells to provide a user with additional information. For example, if a spreadsheet incorporating teachings of the present invention provides a display representing fifteen simplified events with four fields such as Event Type, Source IP Address, Destination IP Address, and "Details", the events may be present a fully expanded display as follows:

| Event Type | Source IP | Dest IP | Details |
| --- | --- | --- | --- |
| String Match | 7.7.7.7 | 1.1.1.1 | alpha |
| String Match | 7.7.7.7 | 2.2.2.2 | bravo |
| String Match | 7.7.7.7 | 2.2.2.2 | charlie |
| String Match | 7.7.7.7 | 2.2.2.2 | delta |
| String Match | 7.7.7.7 | 3.3.3.3 | echo |
| String Match | 8.8.8.8 | 2.2.2.2 | foxtrot |
| String Match | 8.8.8.8 | 3.3.3.3 | golf |
| String Match | 8.8.8.8 | 3.3.3.3 | hotel |
| String Match | 8.8.8.8 | 3.3.3.3 | india |
| String Match | 8.8.8.8 | 4.4.4.4 | juliet |
| String Match | 8.8.8.8 | 5.5.5.5 | kilo |
| String Match | 9.9.9.9 | 3.3.3.3 | lima |
| String Match | 9.9.9.9 | 4.4.4.4 | mike |
| String Match | 9.9.9.9 | 4.4.4.4 | November |
| String Match | 9.9.9.9 | 4.4.4.4 | oscar |

As may be apparent from the above list, displaying the information in a fully expanded way can become problematic. As the number of events displayed increases, the expanded format may be difficult to use. It may be difficult to determine how many events a user has received. In addition, it may be hard to find trends in the events. Moreover, as the number of events received grows, scanning the list to find a particular field may become difficult. To alleviate problems associated with the displaying of event information in this manner, a spreadsheet incorporating teachings of the present invention, for example spreadsheet 40, may be contracted to display event groups. For example, the above list of fifteen events may be displayed as follows:

| Count | Event Type | Source IP | Dest IP | Details |
| --- | --- | --- | --- | --- |
| 15 | String Match | + | + | + |

In this display format a user may be able to determine that there exist 15 events of type "String Match". The "+" symbol in the Source IP column, as mentioned above, may indicate that there are multiple values that can be expanded by double clicking on the Source IP cell containing a "+". In operation, double clicking on the "+" symbol, may allow a user to traverse down an n-ary tree such as the one depicted in FIG. 3a and view the values represented by the "+" symbol.

In the example provided by the fifteen simplified events, double clicking on the "String Match" row, may generate the following display:

| Count | Event Type | Source IP | Dest IP | Details |
|---|---|---|---|---|
| 5 | String Match | 7.7.7.7 | + | + |
| 6 | | 8.8.8.8 | + | + |
| 4 | | 9.9.9.9 | + | + |

The above display indicates that there are 5 events that have the Event Type "String Match" and the Source IP Address "7.7.7.7", 6 events that have the Event Type "String Match" and the Source IP Address "8.8.8.8", and 4 events that have the Event Type "String Match" and the Source IP Address "9.9.9.9". The expanding process may continue. For example, selecting the 6 events that have the Event Type "String Match" and the Source IP Address "8.8.8.8" by double clicking on the "8.8.8.8" row, may cause the generation of the following display:

| Count | Event Type | Source IP | Dest IP | Details |
|---|---|---|---|---|
| 5 | String Match | 7.7.7.7 | + | + |
| 1 | | 8.8.8.8 | 2.2.2.2 | + |
| 3 | | | 3.3.3.3 | + |
| 1 | | | 4.4.4.4 | + |
| 1 | | | 5.5.5.5 | + |
| 4 | | 9.9.9.9 | + | + |

This display may indicate that of the 6 events that have the Event Type "String Match" and the Source IP Address "8.8.8.8", one event each has the Destination IP address "2.2.2.2", "4.4.4.4", and "5.5.5.5", and 3 events have the Destination IP address "3.3.3.3". The "3.3.3.3" row may be further expanded to yield the following display:

| Count | Event Type | Source IP | Dest IP | Details |
|---|---|---|---|---|
| 5 | String Match | 7.7.7.7 | + | + |
| 1 | | 8.8.8.8 | 2.2.2.2 | + |
| 1 | | | 3.3.3.3 | golf |
| 1 | | | | hotel |
| 1 | | | | india |
| 1 | | | 4.4.4.4 | + |
| 1 | | | 5.5.5.5 | + |
| 4 | | 9.9.9.9 | + | + |

In the above display, three paths have been expanded from a root down to a leaf of a tree. In an embodiment presenting event information in a display like the above display, nodes at a given depth, where depth represents the number of "hops" from the root of the tree, may appear in the same column.

In addition to count information and expandability, a display such as spreadsheet 40 may allow for presenting information relating to the severity of an attack.

Some events may be more severe than others. Some events may represent unmistakable and devastating actions, while others may represent occurrences that are either less damaging, more ambiguous, or both. In order to give an indication of the severity of an event, an intrusion detection system incorporating teachings of the present invention may define three severities: Informational, Warning and Critical. An indication scheme that may be incorporated into a display like spreadsheet 40 may include severity indicating colors. For example, the color green may indicate an Informational level, yellow may indicate a Warning level, and red may indicate a Critical level. Each event may be assigned one severity and when displayed as a single event may be displayed in a color associated with the assigned severity.

As mentioned above, a display like spreadsheet 40 may display events in event groups. As such, some embodiments of the present invention may incorporate a severity propagation scheme. For example, if a group of events exist and the group is displayed as a group, the severity of the group may be indicated as the severity of the most severe event in the group. For example, if an event group contains one Critical event and seventeen Informational events, then the severity of the group may be displayed as Critical. Other propagation schemes may also be used.

In the embodiment of FIG. 2, the severity of a group of events represented by a row may be reflected in spreadsheet 40 by changing the background color of the cells in column 42. For example, if row 58 has a severity different than row 52, cells 60 and 62 may be displayed in different colors. In preferred embodiments, as rows 52 and 58 are modified, for example, through the addition or deletion of events and the manipulation of rows by a user, the color of cells 60 and 62 will be modified in near real time to indicate changes in severity.

In addition to count information, expandability, and severity information, a display such as spreadsheet 40 may accommodate a display buffer. Fields in an event may typically have values that can be expressed with only a few characters, and therefore, may be easily displayed in a single cell of spreadsheet 40. Sometimes, however, events may have a field too long to be displayed in a single cell. For example, if an e-mail message is an event, the text or body of the e-mail message may be too large to be displayed in a cell. As such, one embodiment of a display incorporating teachings of the present invention may accommodate an overly large field by storing large fields in a context buffer. If an event represented by a row has a context buffer, the count value in column 42 may be displayed, for example, in bold.

Figure 3A:
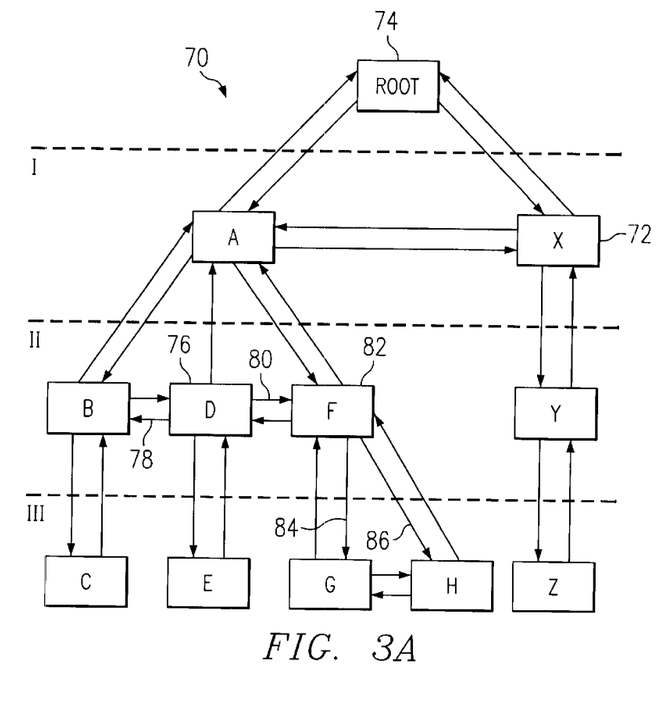
FIG. 3a depicts a representative n-ary tree that incorporates teachings of the present invention.

To facilitate displaying events in displays like spreadsheet 40, events may be mapped into an n-ary tree, such as the tree depicted in FIG. 3a. FIG. 3a depicts a representative n-ary tree 70 that incorporates teachings of the present invention. N-ary tree 70 may help relate data representing events, such as the sample data indicated in FIG. 3b, to an m by n column/row display such as spreadsheet 40 of FIG. 2. In one embodiment of the present invention, m may represent the number of fields in an event or, as depicted in FIG. 2, the number of columns in addition to column 42, and n may represent the number of consolidated events or rows.

One technique for mapping a node of tree 70 with a cell on a display such as spreadsheet 40 may involve incorporating a row number field in a Node object, such as node object 72. Such an approach, however, may require an update of every node in tree 70 each time a branch is added or removed. As the amount of received event information increases, such extensive tree recalculation may become inefficient and too time consuming. Insertion and removal time frames for nodes may preferably occur in O(ln(n)) average case and O(n) worst case.

To help speed the mapping of events into an n-ary tree of depth m, a system incorporating teachings of the present invention may include a node object having the following data members: RIN (Row Indicator Node) Count; pointers to the Node's "least child", "greatest child", "lesser sibling" and "greater sibling"; a "Status Manager" pointer; and a "Data Element" pointer.

A RIN Count may be a number indicative of the quantity of RIN's below a given node on a tree. A RIN (Row Indicator Node) may be a node whose branch from itself up to a root node 74 defines a row on a display, such as row 52 of FIG. 2. For example, if all rows in a display are expanded through the second column, then all nodes at depth II in tree 70 may be RINs. If a row is expanded one level, then all the children of the RIN become RINs, and the original RIN is no longer a RIN. If a row is contracted one level, then the parent of the RIN becomes the new RIN.

As such, the RIN Count of a given node is the number of RINs that are descendants of or exist below the given node. For example, if there are 4 rows on a display presenting event information from tree 70, then the RIN Count of root node 74 is 4. If, for example, another tree has a root node with two children, and there are 3 rows corresponding to the first child of the root node and there are 12 rows corresponding to the second child of the root node, then the RIN Count of the first child is 3 and the RIN Count of the second child is 12. In some embodiments, the RIN count of a RIN may be 1.

In an embodiment of the present invention that employs a RIN Count, the RIN Count may facilitate calculation of a spreadsheet row number for a node in the branch without additional tree-traversals. In such embodiments, the act of placing a node in a tree effectively allows for determination of a spreadsheet row in which to locate an indication of the node. The sum of individual RIN Counts for nodes traversed while placing a node in a tree may represent the spreadsheet row in which to locate the node.

In addition to RIN Count information, a node may also have a least child pointer, a greatest child pointer, a lesser sibling pointer, and a greater sibling pointer. Each node in a tree may have a set of pointers to a select group of family members in order to enable fast, ordered traversal of the node tree. Two of the pointers may point to siblings, and two of the pointers may point to children.

For example, a node such as node 76, may have a lesser sibling pointer 78 that points to the sibling directly "less than" node 76 and a greater sibling pointer 80 that points to the sibling directly "greater than" node 76. If, in another example, there are four integer siblings "1, 3, 4, 19", then 3's lesser sibling may be 1, and 3's greater sibling may be 4. In this example, 1 has no lesser sibling, and 19 has no greater sibling. Having a lesser sibling pointer and a greater sibling may enable traversal of siblings in either direction.

Each node may also have a pointer to its "least" and its "greatest" child. In FIG. 3*a*, for example, node 82 may have a least child pointer 84 and a greatest child pointer 86. These two pointers may provide access to the "top" and the "bottom" of a sibling list. As such, a tree may be traversed based on the sorting scheme of a particular column. For example, if a column such as column 44 of FIG. 2, is sorted in ascending order, nodes at a tree depth associated with column 44 may be traversed from "least" to "greatest". If the order is descending, then nodes may be traversed from "greatest" to "least".

In some embodiments, a column manager object may store a list of columns and their respective depths, and each column may store a sorting scheme, such as ascending or descending, for columns of a given depth. If each node knows its depth, and the depth in the tree corresponds to the column number, a node may be able to provide its "lesser" or "greater" sibling, or its "least" or "greatest" child without a user providing the node with a particular sorting scheme. In effect, the node may determine the appropriate sorting scheme itself by asking the column manager and may traverse through an appropriate sibling or child. As a result, a node may not need to be reordered when sorting schemes are changed.

Figure 3B:
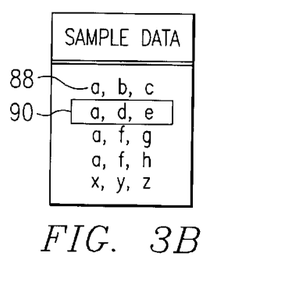

Each node in tree 70 may correspond to a single event data element, for example data element 88 of FIG. 3*b*. As depicted in FIG. 3*b*, a single event may cause the generation of a data element series 90, which may include more than one data element 88. In one embodiment of the present invention, data elements, like data element 88, may represent a single field of the data element series. The fields could include various types of information. For example, data element series 90 may include a date field, a time field, and an address field. These types may be encapsulated into an efficient "data element" object that knows how to compare itself to other data elements and convert itself into a string. This data element may be compact, and may be able to ensure fast comparison and conversion to a string.

In some embodiments, an element may not be converted to strings unless the element is displayed. As such, an element embodied by a number may remain a number to allow number-based comparison rather than string-based comparison. This may allow faster comparisons and tree traversals.

Each node may also have a status manager. The status manager may keep track of how many events of each severity level pass through a given node. This may allow a node to know its status even if it is not a RIN, and therefore, not sending status to the display at the time. As such, if rows are contracted or expanded to turn non-RINs into RINs, no extra calculation of status may be necessary. As a result, when the non-RIN node becomes a RIN, it may be able to update a row's event counts and colors in near real time.

Figure 4A:
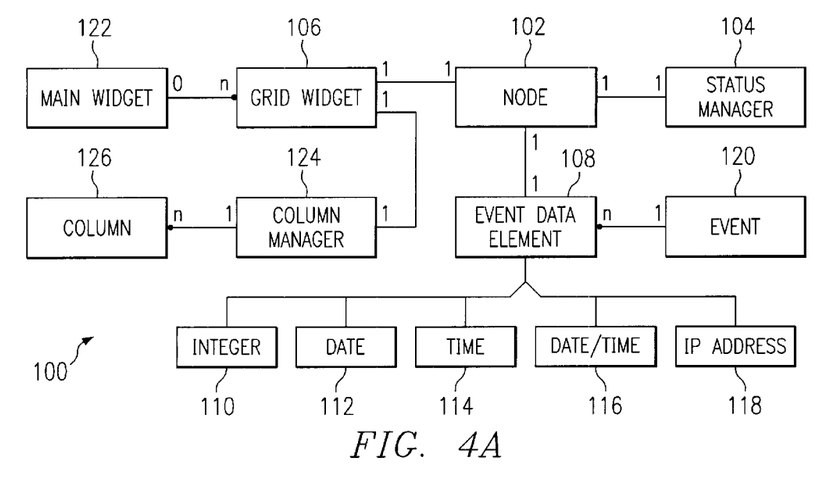
FIG. 4a depicts a schematic representation of one embodiment of object relationships within an object-oriented program incorporating teachings of the present invention.

A node may be related to various other nodes and managers in a number of ways. For example, FIG. 4*a* depicts a schematic representation 100 of one embodiment of object relationships within an object-oriented program incorporating teachings of the present invention. As depicted, node 102 has a one to one relationship with a status manager object 104, a grid object 106, and an event data element object 108. Event data element object 108 may include one or more of several elements of data. The data included in event data element object 108 may represent, for example, data, such as data element 88 of FIG. 3*b*. In one embodiment, event data element 108 may include either an integer data element 110, a date data element 112, a time data element 114, a date/time data element 116, or an address data element 118.

As depicted in FIG. 4*a*, an event object may have a one to "n" relationship with event data element 108. As such, event object 120 may include more than one data element.

Also depicted in FIG. 4*a* is a main object 122, which may be related to "n" grid widgets, like grid widget 106. Grid widget 106 may also be related to a column manager object 124, which may be related to "n" column objects, for example column object 126.

Figure 4B:
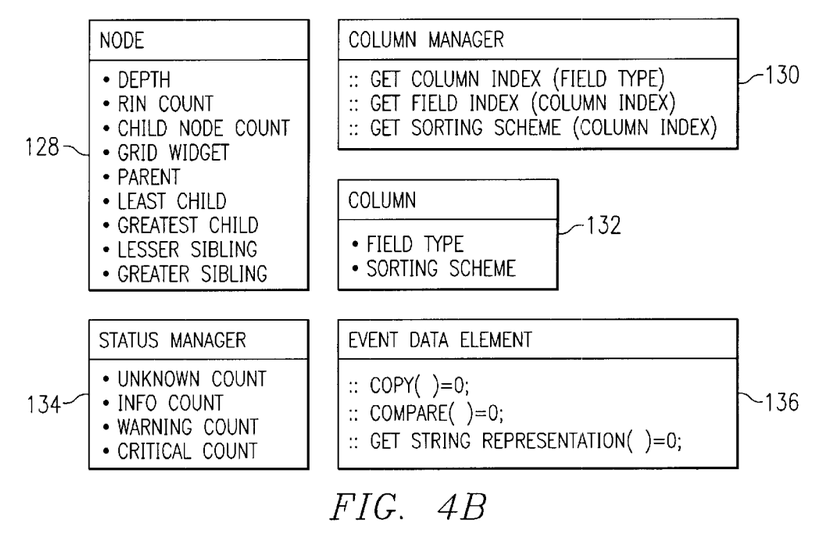

The various objects of FIG. 4*a* may be defined in several different ways. In one embodiment, the objects of FIG. 4*a* may be instances of classes defined by the attributes and methods described in FIG. 4*b*. FIG. 4*b* depicts one embodiment of potential class attributes and methods for the objects of FIG. 4*a*. For example, a node object such as node 102 of FIG. 4*a* may be defined in accordance with node class 128. A column manager object such as column manager 124 may be defined in accordance with column manager class 130. A column object such as column 126 may be defined in accordance with column class 132. A status manager object such as status manager 104 may be defined in accordance with status manager class 134, and an event data element object such as event data element 108 may be defined in accordance with event data element class 136.

Although the present invention has been described in detail, it should be understood that various changes, substitutions and alterations can be made hereto without departing from the spirit and scope of the invention as defined by the appended claims.

What is claimed is:

1. A system for consolidating and sorting event data, the system comprising:
   a computer readable medium storing an application;
   the application including a node mapped into a tree; and
   the node having a row indicator node count, a data element reference, a least child reference, a greatest child reference, a lesser sibling reference, a greater sibling reference, a parent reference, and a status manager reference.

2. The system of claim 1, further comprising:
   a computing platform communicatively coupled to the computer readable medium.

3. The system of claim 1, wherein the application comprises an object-oriented program and the at least one node comprises an instantiation of a node class within the object-oriented program.

4. The system of claim 3, further comprising a plurality of nodes having respective row indicator node counts, data element references, least child references, greatest child references, lesser sibling references, greatest sibling references, parent references, and status manager references.

5. The system of claim 3, wherein the least child reference comprises a first pointer to a second instantiation of a node class within the object-oriented program, the greatest child reference comprises a second pointer to a third instantiation of the node class within the object-oriented program, the lesser sibling reference comprises a third pointer to a fourth instantiation of the node class within the object-oriented program, the greatest sibling reference comprises a fourth pointer to a fifth instantiation of the node class within the object-oriented program, and the parent reference comprises a fifth pointer to a sixth instantiation of the node class within the object-oriented program.

6. The system of claim 5, wherein the data element reference comprises a sixth pointer to a data element object and the status manager reference comprises a seventh pointer to a status manager object.

7. A computer system for consolidating and sorting event data, comprising:
   a computing platform communicatively coupled to a computer readable medium and a network;
   an application stored on the computer readable medium, the application including at least one node mapped into a tree;
   the at least one node having a data element reference comprising a pointer to a data element comprising event data received via the network; and
   wherein the at least one node comprises a lesser sibling reference and a greater sibling reference.

8. The computer system of claim 7, wherein the application comprises an object-oriented program and the at least one node comprises an instantiation of a node class within the object-oriented program.

9. The computer system of claim 7, wherein the tree comprises an n-ary tree.

10. The computer system of claim 7, wherein the application comprises an object-oriented program and the at least one node comprises an instantiation of a node class within the object-oriented program, further wherein the tree comprises an n-ary tree of depth m.

11. The computer system of claim 10, further comprising an executable operable to generate a spreadsheet having a number of columns.

12. The computer system of claim 11, wherein the number of columns equals m.

13. The computer system of claim 11, wherein the spreadsheet has an expandable number of rows.

14. The computer system of claim 11, further comprising a plurality of nodes that each comprise a distinct instantiation of the node class.

15. The computer system of claim 14, wherein the spreadsheet has a maximum number of rows equal to a total number of distinct root to leaf branches in the n-ary tree.

16. The computer system of claim 11, wherein the spreadsheet comprises a number of cells, further wherein the spreadsheet is operable to indicate a severity level of at least one event represented in a given cell.

17. The computer system of claim 16, wherein the spreadsheet uses a color scheme to indicate the severity level.

18. A method for consolidating and sorting event data, comprising:
   providing event data via a network to an event sorter comprising a tree with a plurality of nodes representing earlier received event data;
   creating a node having a data element reference comprising a pointer to a data element representing the provided event data;
   identifying a location within the tree in which to place the created node;
   placing the node at the location;
   identifying a signature in network data, the signature associated with an attack on the network;
   generating event data in response to the identifying of the signature; and
   sending the event data to the event sorter.

19. The method of claim 18, further comprising:
   presenting on a display a spreadsheet that graphically represents the tree of the event sorter.

20. The method of claim 19, further comprising:
   determining a cell of the spreadsheet that requires modification when the event sorter receives new event data; and
   modifying the cell to indicate receipt of the new event data.

21. The method of claim 19, further comprising:
   identifying an event severity for the provided event data; and
   indicating the event severity on the spreadsheet.

22. A computer system for consolidating and sorting event data, comprising:
   an event sorter means for storing event data in a tree having a plurality of nodes; and
   a means for identifying a signature in network data, generating event data in response, and transmitting the event data to the event sorter means for storing the event data in a tree.

23. The computer system of claim 22, wherein the tree comprises an n-ary tree.

24. The computer system of claim 22, further comprising an executable operable to generate a spreadsheet having a number of column based on the event data stored in a tree.

25. The computer system of claim 24, wherein the spreadsheet has an expandable number of rows.

26. The computer system of claim 24, wherein the plurality of nodes each comprise a distinct instantiation of the node class.

27. The computer system of claim 26, wherein the spreadsheet has a maximum number of rows equal to a total number of distinct root to leaf branches in the n-ary tree.

28. The computer system of claim 24, wherein the spreadsheet comprises a number of cells, further wherein the spreadsheet is operable to indicate a severity level of at least one event represented in a given cell.

29. The computer system of claim 24, wherein the spreadsheet uses a color scheme to indicate the severity level.

* * * * *